Feb. 10, 1925. 1,525,807
G. H. GIBSON
METHOD OF AND APPARATUS FOR FLUID METERING
Filed Aug. 1, 1918 4 Sheets-Sheet 1

INVENTOR
George H. Gibson
BY
his ATTORNEYS

Feb. 10, 1925.

G. H. GIBSON

1,525,807

METHOD OF AND APPARATUS FOR FLUID METERING

Filed Aug. 1, 1918     4 Sheets—Sheet 3

INVENTOR
George H Gibson
BY
his ATTORNEYS

Feb. 10, 1925.

G. H. GIBSON

METHOD OF AND APPARATUS FOR FLUID METERING

Filed Aug. 1, 1918

INVENTOR
George H. Gibson
BY
Chambers & Hubbell
his ATTORNEYS

Patented Feb. 10, 1925.

1,525,807

UNITED STATES PATENT OFFICE.

GEORGE H. GIBSON, OF MONTCLAIR, NEW JERSEY.

METHOD OF AND APPARATUS FOR FLUID METERING.

Application filed August 1, 1918. Serial No. 247,858.

*To all whom it may concern:*

Be it known that I, GEORGE H. GIBSON, a citizen of the United States of America, and a resident of Montclair, in the county of Essex and State of New Jersey, have invented a certain new and useful Improvement in Methods of and Apparatus for Fluid Metering, of which the following is a true and exact description, reference being had to the accompanying drawings, which form a part thereof.

My present invention comprises improvements especially devised for use in measuring the rates of flow of fluids such as liquids, gases and vapors, and one of the specific objects of the invention is to provide improved fluid flow measuring apparatus in which an electric current is automatically maintained by flow responsive means at a strength which is proportional to, or is a function of the rate of flow of a fluid, and which comprises novel electrical provisions for automatically compensating for changes in the density of the fluid measured, resulting from changes in its temperature or other changes in the condition of the fluid. My invention is of especial utility in determining the efficiency of operation of a steam plant, and my invention, in one of its aspects, consists in the novel means which I have devised for conjointly measuring various fluid rates of flow which it is necessary or desirable to know to determine the efficiency of operation of a steam plant. In particular my invention comprises improved means for obtaining with a single electrical meter a measure of a plurality of electrical currents proportional respectively to the rate of feed water supply, steam output, the supply of air to support combustion, etc.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of my invention.

Figure 1:
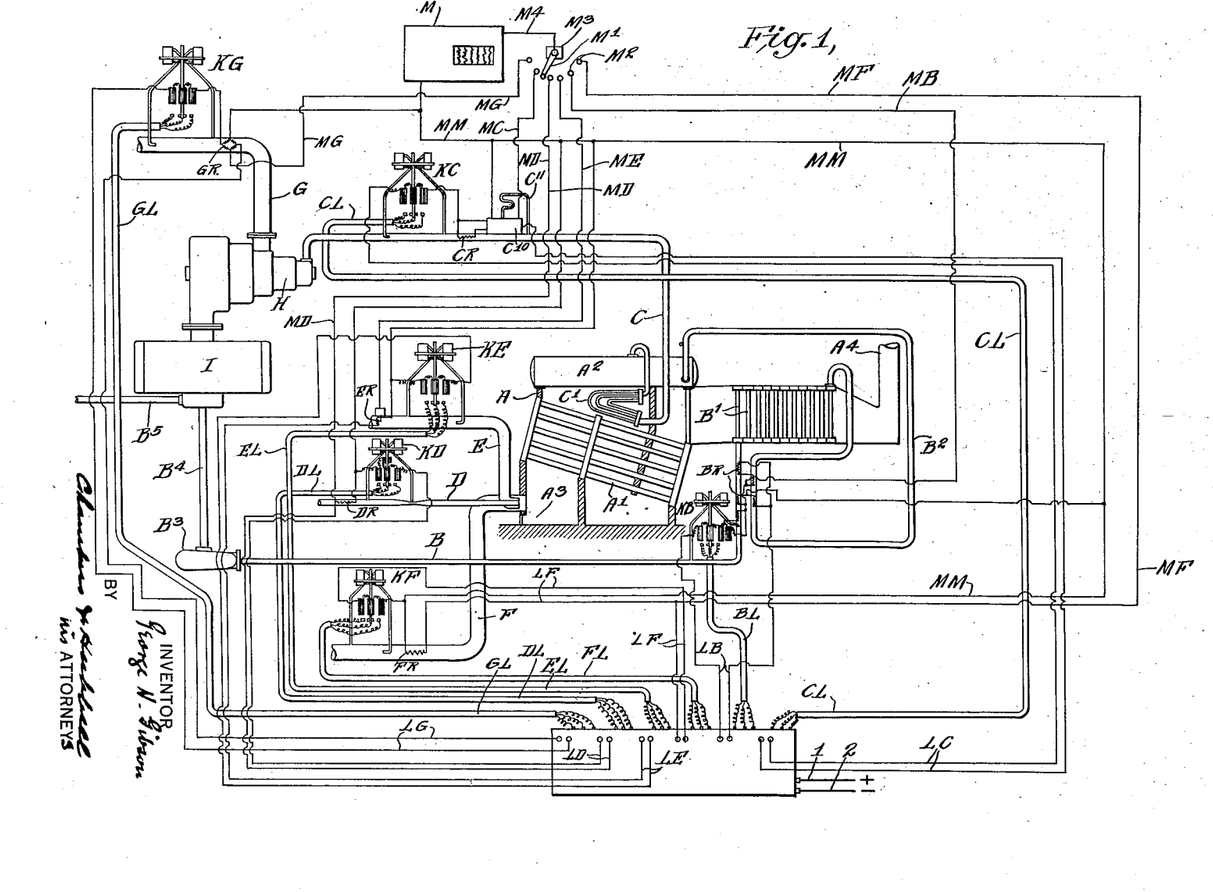
Figure 1 is a diagrammatic representation of a steam plant comprising associated means for measuring fluid rates of flow in various conduits of the system with automatic provisions for correcting, for changes in fluid density resulting from changes in temperature or pressure, and in the case of steam for changes in pressure and superheat.

In the steam plant diagrammatically illustrated in Fig. 1, A represents the boiler furnace, and A' represents the water tubes, $A^2$, the steam and water drum, $A^3$, the combustion chamber, and $A^4$, the stack outlet of the furnace. The steam generated in the boiler and superheated in the superheating coils C' of the furnace A, passes in the plant illustrated through the conduit C to the steam turbine H. B represents the boiler feed water supply line, and B' represents a feed water preheater, shown as mounted in the breeching connecting the outlet from the furnace proper, to the stack $A^4$. The outlet pipe $B^2$ from the preheater $B'$ is shown as leading into the steam and water drum $A^2$. The boiler feed pump $B^3$ has its outlet connected to the feed line B, and has its inlet connected by the pipe $B^4$ to the hot well of the condenser I into which the turbine H exhausts. $B^5$ represents a make-up water supply pipe. The furnace, as shown, burns liquid fuel supplied through a pipe D, and atomized by primary air supplied under pressure through the conduit E, secondary air being supplied at, or about atmospheric pressure through the conduit F. As shown, a bleeder pipe G, leading from an intermediate stage of the turbine H, supplies low pressure steam for heating or other purposes. Associated with each of the conduits B, C, D, E, F and G are electromagnetic flow balances KB, KC, KD, KE, KF and KG respectively. These balances are all of the same general type and in fact are shown as identical in construction except that the balance KB comprises a compensating coil not used in the others, as hereinafter explained. A detailed description of one of these balances, for instance balance KF, will thus suffice for all of the balances.

Figures 2, 3, 4, 5:
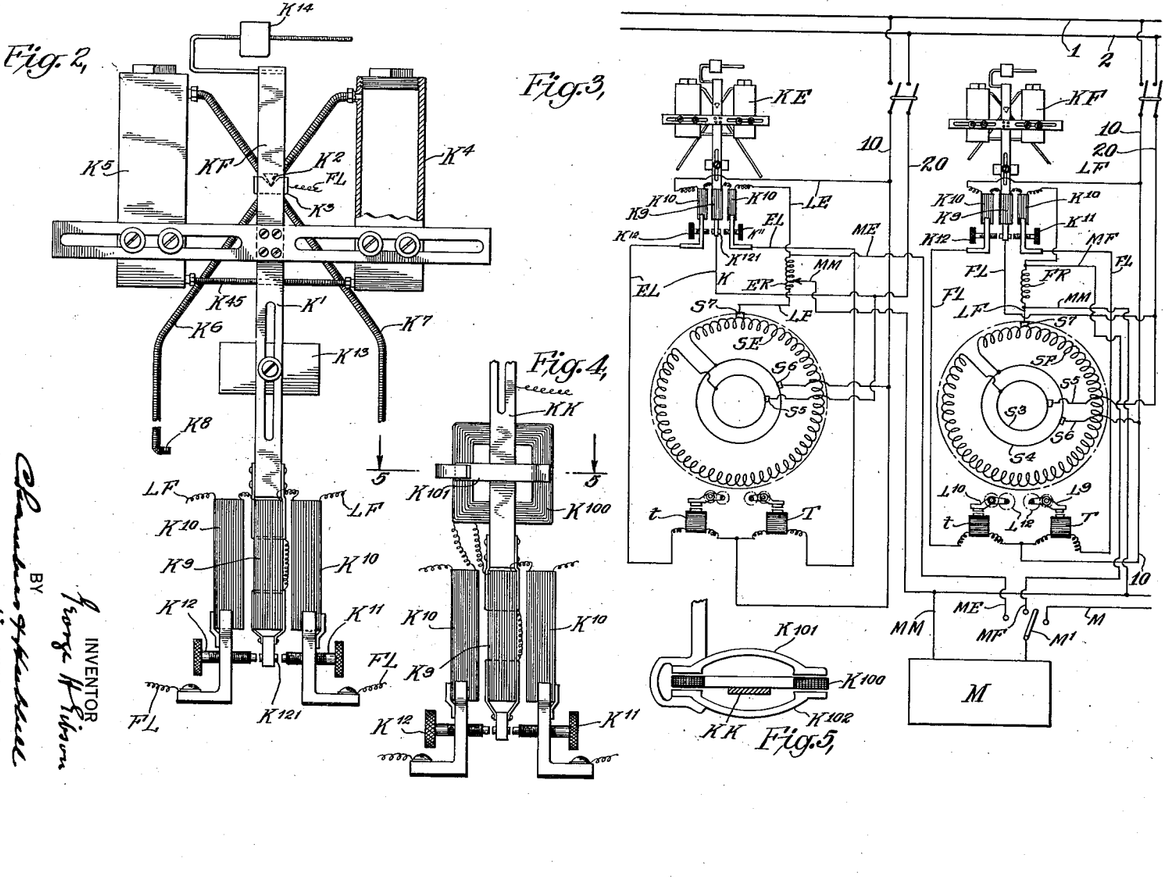
Figure 2 is an elevation partly in section of one of the electromagnetic flow balances employed.
Figure 3 is a diagram of a portion of the apparatus employed in the plant shown in Figure 1.
Figure 4 is an elevation of a portion of a modified electromagnetic balance of modified construction.
Figure 5 is a section on the line 5—5 of Figure 4.
Figure 6:
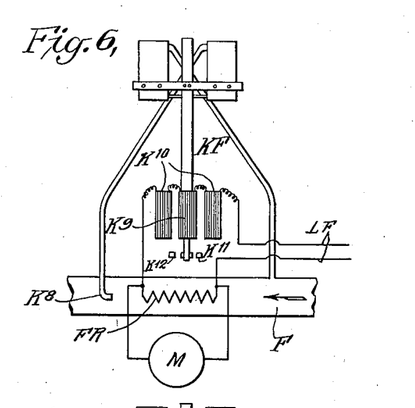
Figure 6 is a diagrammatic representation of the portion of the apparatus shown in Figure 1 for measuring the liquid fuel supplied to the furnace.

The balance KF is shown in Fig. 2, and the electrical connections between it and a cooperating resistance element SF of an electrical current regulator, and an electrical measuring instrument M, are shown in Figs. 3 and 6. As shown in Fig. 2, the flow balance KF comprises a frame $K'$ provided with a knife edge pivot $K^2$ through which the frame is pivotally mounted on a suitable bearing block $K^3$. The frame $K'$ comprises a horizontal cross arm on which receptacles $K^4$ and $K^5$ are mounted at opposite sides of, and at adjustable distances from the vertical plane through the bearing edge of the pivot $K^2$. The receptacles $K^4$ and $K^5$ are partially filled with a sealing liquid as water, mercury or oil, and are connected at their lower ends by the pipe $K^{45}$. The upper end of the chamber $K^4$ is connected by a flexible conduit $K^6$ to a Pitot tube $K^8$ facing the flow in the conduit F, and a flexible pipe $K^7$ transmits the static pressure from the conduit F to the upper end of the chamber $K^5$. At the lower end of the frame $K'$ there is mounted an electrical coil $K^9$, which plays between stationary coils $K^{10}$ connected in series with the coil $K^9$ in the circuit LF. The movable coil $K^9$ and the coils $K^{10}$ cooperate to form an electrodynamometer of the Kelvin balance type. The lower end of the balance frame $K'$ carries a contact $K^{121}$, which lies between, and in the neutral position of the apparatus shown in Fig. 2, stands out of engagement with adjustable contacts $K^{11}$ and $K^{12}$, which are respectively engaged when the balance $K'$ oscillates in the counter clockwise direction or clockwise direction respectively. The frame $K'$ carries a vertically adjustable weight $K^{13}$, and a horizontally adjustable weight, and these weights should be so adjusted that with the proper amount of sealing liquid in the chambers $K^4$ and $K^5$ and connecting tube $K^{45}$, and with equal pressures in the upper ends of the chambers $K^4$ and $K^5$, the frame $K'$ will be in neutral equilibrium in any position of the latter within its range of oscillation. The pivoted frame $K'$, with the chambers $K^4$ and $K^5$, forms a differential pressure gauge of the tilting U tube type. Connected to the conduit F, as described, the gauge is subjected to a turning moment by the displacement of sealing liquid therein resulting from a fluid flow in the conduit F, which is proportional to the difference between the Pitot tube pressure and the static pressure in the conduit. As is hereafter more fully explained, this turning moment is proportional to the square of the velocity of fluid flow in the conduit F. The turning moment impressed upon the gauge by said pressure differential may be balanced by an electrical current of suitable strength through the dynamometer windings $K^9$ and $K^{10}$. Since the turning moment impressed on the balance by the current flowing through the windings $K^9$ and $K^{10}$ is proportional to the square of that current, the latter is thus directly proportional to the velocity of fluid flow in the conduit F. An electrical current regulator L is so constructed and connected to the balance KF, and to the other balances KB, KC, KD, KE and KG that it supplies the dynamometer windings of each of the balances with an electrical current of the proper strength to normally maintain the balance in its neutral position.

Figure 12:
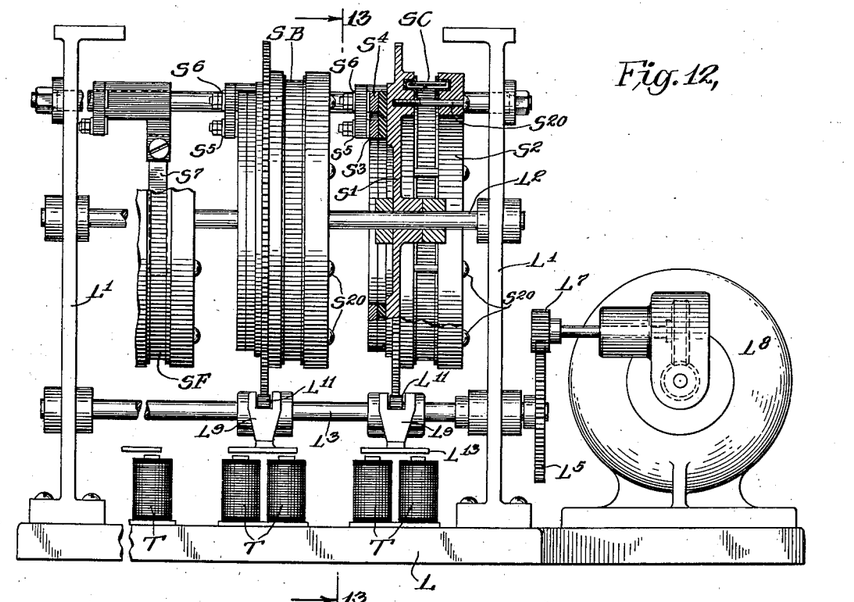
Figure 12 is an elevation with parts broken away and in section of the current regulator employed in Figure 1.
Figure 13:
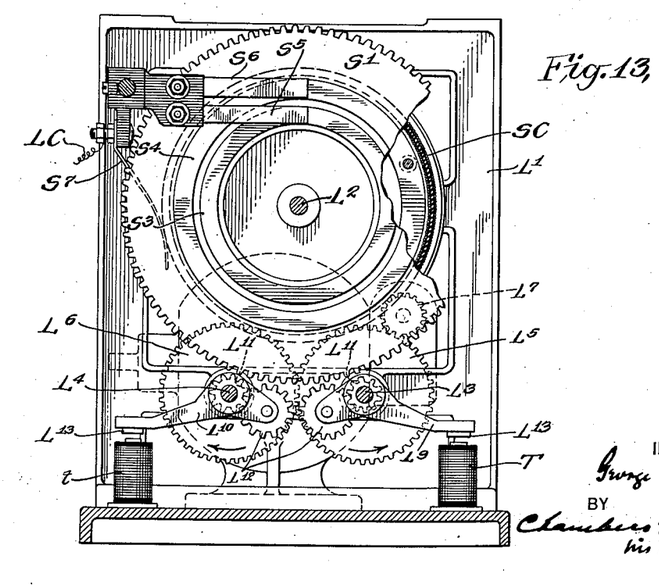
Figure 13 is a section on the line 13—13 of Figure 12.

The regulator L, as shown structurally in Fig. 12, comprises framework $L'$, in which is mounted a stationary shaft $L^2$. On the shaft $L^2$ there are journalled resistance elements SC, SB, SF, etc, one for each of the balances KC, KB, KF, KE, KD and KG. Each of these resistance elements comprises a resistance conductor coiled about an annular body of insulating material, which, with the resistance conductor coiled about it, is clasped between a gear wheel $S'$ journalled on the shaft $L^2$, and a clamping ring $S^2$ secured to the gear $S'$ by screws $S^{20}$. On its side opposite to that at which the corresponding resistance conductor is located, each gear $S'$ carries a pair of annular contact rings $S^3$ and $S^4$. One terminal of the corresponding resistance conductor SC, SB, SF, etc. is connected to the ring $S^3$ and the other terminal to the ring $S^4$. Contact brushes $S^5$ and $S^6$, carried by the framework of the regulator, engage the contact rings $S^3$ and $S^4$, respectively, and connect these rings through the branch conductors 10 and 20 of Fig. 3 to electrical supply conductors 1 and 2 respectively. Associated with each of the gears $S'$, is a corresponding brush or flexible contact member $S^7$ secured to the framework $L'$ and bearing against the corresponding resistance conductor $SC$, $SB$, $SF$, etc.

The dynamometer windings of the balance $KF$ are included in a circuit $LF$ having one end connected to the brush $S^7$ engaging the resistance conductor $SF$, and having its other end connected to the branch supply conductor 10. With this arrangement an electromotive force is impressed on the circuit $LF$, and hence on the coils $K^9$ and $K^{10}$ of the balance $KF$, which is equal to the voltage between the supply conductors 1 and 2, or some fraction thereof, depending on the angular adjustment of the gear $S'$ on which the resistance conductor $SF$ is mounted. The dynamometer windings of the balances $KB$, $KC$, $KD$, $KE$ and $KG$ are similarly connected by circuits $LB$, $LC$, $LD$, $LE$ and $LG$ to the corresponding resistance conductors $SB$, $SC$, $SD$, $SE$ and $SG$ respectively.

Means are provided for automatically adjusting each of the gears $S'$ separately about the supporting shaft $L^2$. These means, as shown, comprise a constantly running motor $L^8$ connected by gears $L^7$ and $L^5$ to a shaft $L^3$ journalled in the framework $L'$, and a second shaft $L^4$ also journalled in the framework $L'$, and carrying a gear $L^6$ meshing with the gear $L^5$. Associated with each gear $S'$ are a pair of levers $L^9$ and $L^{10}$ journalled on the shafts $L^3$ and $L^4$ respectively, and each carrying a spur gear $L^{12}$ constantly in mesh with a spur gear $L^{11}$ secured to the corresponding supporting shaft $L^3$ or $L^4$. Normally the gears $L^{12}$ are out of mesh with the gear $S'$, but each of the levers $L^9$ and $L^{10}$ may be oscillated to swing its gear $L^{12}$ into mesh with the corresponding gear $S'$. When in mesh with the latter the gear $L^{12}$, carried by the lever $L^9$, causes the gear $S'$ to be driven in one direction from the motor $L^8$ through the shaft $L^3$; and the gear $L^{12}$ carried by the lever $L^{10}$, when in mesh with the gear $S'$, causes the latter to be rotated in the opposite direction by the motor $L^8$ through shaft $L^4$. Each of the levers $L^9$ carries an armature $L^{13}$ working above a corresponding electromagnet $T$, and each of the levers $L^{10}$ carries an armature working above a corresponding electromagnet $t$. The coil winding of the electromganet $T$, associated with the disc $S'$, carrying the resistance conductor $SF$, is connected by one conductor $FL$ between the contact $K^{11}$ of the balance $KF$ and the branch supply conductor 10. Similarly the winding of the corresponding electromagnet $t$ is connected by a second conductor $FL$ between the contact $K^{12}$ of balance $KF$ and the supply conductor 10, while the contact $K^{121}$ is connected by a third conductor $FL$ to the branch supply conductor 20. The contacts $K^{11}$, $K^{12}$, and $K^{121}$ of the other balances $KB$, $KC$, $KD$, $KE$ and $KG$ are similarly connected with the windings of the appropriate electromagnets $T$ and $t$, and the source of electrical current by conductors $BL$, $CL$, $DL$, $EL$ and $GL$, respectively.

With the arrangement described, on an increase in the flow through the conduit $F$ and the corresponding increase in the difference between the pressures transmitted to the upper ends of the chambers $K^4$ and $K^5$, there is a resultant movement of the sealing liquid from the chamber $K^4$ into the chamber $K^5$ of the balance $KF$, oscillating the latter in the counter clockwise direction, and thereby bringing about an engagement between the contact $K^{121}$ and the contact $K^{11}$ of the balance. This results in energizing the winding of the corresponding electromagnet $T$, whereupon the lever $L^9$ is shifted to bring its gear $L^{12}$ into mesh with the gear $S'$ carrying the resistance conductor $SF$. When the latter is thus geared to the shaft $L^3$ the latter turns the gear $S'$ in the clockwise direction and thereby increases the potential difference between the supply conductor 10 and the brush $S^7$ engaging the resistance conductor $SF$, and this turning motion is continued until the voltage thus impressed on the terminals of the circuit $LF$, including the coils $K^9$ and $K^{10}$ of the balance $KF$, creates a current flow through those coils strong enough to swing the frame $K'$ back to the neutral position and thus separate the contacts $L^{121}$ and $K^{11}$. Similarly, when the displacement of the sealing liquid takes place from the chamber $K^5$ into the chamber $K^4$ of the balance $KF$, and the frame $K'$ oscillates in the clockwise direction so as to move the contact $K^{121}$ into engagement with the contact $K^{12}$, the corresponding electromagnet $t$ is energized, and the gear $S'$, carrying resistance conductor $SF$, is thrown into driving relation with the shaft $L^4$ by the shift of the lever $L^{10}$ and gear $L^{12}$ carried by the latter. This causes the disc $S'$ to be rotated in the counter clockwise direction until the decrease in strength of the electrical current flowing through the coils $K^9$ and $K^{10}$ of the balance $KF$ permits the frame $K'$ to return to its neutral position in which the contact $K^{121}$ engages neither contact $K^{11}$ nor contact $K^{12}$ of the balance $KF$. The proper balancing current is maintained through the dynamometer windings of the other balances $KB$, $KC$, etc. in the same manner.

If $v$ represents the velocity of flow, $d$ the density of the fluid flowing in the conduit $F$, and $p$ the difference between the Pitot tube pressure transmitted through the tube $K^6$ and the static pressure transmitted through the tube $K^7$ to the balance KF, the relation between velocity, density and pressure may be expressed by the following equation: $p = Av^2d$ where A is a constant. The weight $w$ of fluid flowing per unit of time is expressed by the equation $w = Bvd$ where B is a constant. From these two equations it follows that $$p = C\frac{w^2}{d}$$

where C is a constant equal to $\frac{A}{B^2}$. The relation between the balancing electrical current, $i$, flowing through the coils $K^9$ and $K^{10}$ and the pressure $p$, may be expressed as follows:

$$p = Di^2$$

where D is a constant. Hence $$w = Ei\sqrt{d}$$

where E is a constant equal to $$\sqrt{\frac{D}{C}}.$$

Where the fluid flowing is a liquid at a constant temperature, or is a permanent gas at a constant temperature and pressure the density $d$ is constant and the weight $w$, of fluid flowing is then in constant proportion to the strength of the balancing electrical current $i$. An ammeter measuring the current flow through the dynamometer coils $K^9$ and $K^{10}$ of the balance KF would, under the conditions just specified, furnish a direct measure of the weight of fluid flowing through the conduit F. Where, however, the fluid is a liquid which varies in temperature, or is a permanent gas varying either in temperature or in pressure, such variations produce changes in density which alter the relation between the weight $w$ of fluid flowing per unit of time and the strength of the balancing current $i$ flowing through the dynamometer coils $K^9$ and $K^{10}$. I have discovered, however, that the effect of a change in gas or liquid density, due to a change in temperature, can be automatically compensated for by placing a suitable resistance, or net work of resistances FR, in the dynamometer circuit LF and locating this resistance FR in the conduit F, or otherwise subjecting it to the temperature of the fluid flowing, and then instead of measuring the current $i$, measuring a potential drop due to the flow of the current $i$ through the resistance FR. The nature of the compensating resistance and the manner in which it effects its desired result may be explained as follows:

At ordinary temperatures and for a limited range between a lower temperature $t_1$ and a higher temperature $t$, the density variation of a liquid or of a permanent gas at a constant pressure, resulting from a change in temperature, can be expressed as follows:

$$d = d_{t_1}[1 + a(t - t_1)].$$

Where $d_{t_1}$ is the fluid density at the temperature $t_1$, and $a$ is a constant negative coefficient, the value of $a$ for air in the neighborhood of 100° F., is about $-.002$, and in the case of water at a temperature between 100° F. and 200° F. is about $-.0003$. If $r$ represents the resistance of the compensating resistance FR, and $e$ represents the potential drop between the terminals of the resistance FR on the flow of the current $i$ through the latter; then $e = ir$. The resistance $r$, for most resistance materials out of which the resistance FR might be formed, will vary with the temperature according to the following law:

$$e = ir_{t_1}[1 + b(t - t_1)].$$

$b$ being a constant coefficient. From the preceding equations, we have $$w = Ei\sqrt{d_{t_1}(1 + a(t - t_1))}.$$

This may be expressed as follows:

$$w = Ei\sqrt{d_{t_1}}(1 + \frac{a}{2}(t - t_1)).$$

(The square of the quantity $$1 + \frac{a}{2}(t - t_1)$$

includes the term $$\frac{a^2}{4}(t - t_1)^2,$$

but this term is so small that it can be, and is disregarded in the preceding equation). From the preceding equations we have $$w = Fe\frac{1 + \frac{a}{2}(t - t_1)}{1 + b(t - t_1)}$$

wherein F is a constant, equal to $$E\frac{\sqrt{d_{t_1}}}{r_{t_1}}.$$

The value of the fraction $$\frac{1 + \frac{a}{2}(t - t_1)}{1 + b(t - t_1)}$$

is constant if $$b = \frac{a}{2}.$$

In other words, if the temperature coefficient of resistance $b$, of resistance conductor FR is equal to one-half of the air density coefficient $a$, the potential drop $e$ across the resistance FR will be proportional to the weight $w$ of air flowing at constant pressure per unit of time. It is practically feasible to use in the resistance FR a material having a temperature coefficient of resistance $b$, equal to one-half the temperature density coefficient $a$, of air or water as stated above. Carbon in one suitable form may be used for air, and in another form may be used for water, since carbon in its various forms has a negative thermal coefficient of resistance varying from about .0003 to .008. It will be apparent, of course, that if a body of carbon having a coefficient of .008 is connected in series with a body of some material such as manganin having a thermal coefficient of zero or practically zero, the compound resistance thus formed may have a thermal coefficient of resistance varying between .008 and zero, depending on the ratio of carbon to manganin in the compound resistance.

In the apparatus shown the air flowing through the conduit F is directly measured by connecting the terminals of the resistance FR to a suitable ammeter indicated in Fig. 1 at M, and in Fig. 6 by $m$. The ammeter M, shown in Fig. 1, is intended for use in measuring the balancing electrical currents passing through each of the various balances KB, KC, KD, KE and KG, as well as through the coils of the balance KF. For this purpose I associate with the meter M a time controlled switch mechanism for successively connecting the meter to the different balance circuits at regular intervals. This switch mechanism, as diagrammatically shown in Fig. 1, comprises a rotating switch arm M' constantly rotated by a suitable clock mechanism $M^3$ and connected by the conductor $M^4$ to one terminal of the meter M. The other terminal of the meter M is connected to a wiring system MM, which is connected in turn to one side of each of the compensating resistances in circuit with the various balances. The switch arm M' sweeps over and successively contacts with a circular series of stationary contacts $M^2$ separately connected to the different compensating resistances. Thus one of these contacts is connected by the conductor MF to the opposite side of the resistance FR from that to which the conducting system MM is connected.

The compensating resistance DR in the fluid fuel conduit D may be formed of carbon or carbon and manganin. One terminal of the resistance DR is connected to the common meter circuit MM, and the other terminal is connected to the appropriate switch contact $M^2$ by a conductor MD.

To measure the quantity rate of flow of the compressed air passing through the conduit E it is necessary to take into account variations in air density resulting from changes in the pressure of the air. This I accomplish by means of a resistance ER formed of material such as carbon having a suitable temperature coefficient which is included in the dynamometer circuit LE and is located in the conduit E, and by means of provisions for connecting more or less of the resistance ER in circuit with the meter M accordingly as the pressure in the conduit E, increases or diminishes. To thus vary the portion of the resistance included in the meter circuit I provide a chamber $E^{10}$ at the side of the conduit E and open at its inner end to that conduit, and in this chamber I locate a piston $E^{11}$ which tends to move outward under the action of the pressure in the conduit and to move inward under the action of a spring $E^{12}$ (see Fig. 10). I connect the piston $E^{11}$ to a switch arm $E^{13}$, which works along the resistance conductor ER. One side of the meter is connected by the wiring MM to the switch contact $E^{13}$, and the conductor ME connects the appropriate terminal of the resistance ER to the corresponding stationary switch contact $M^2$. With this arrangement the portion of the resistance ER in circuit with the meter M will vary directly with the pressure in the conduit E, and hence will vary in proportion to the changes in density of the air flow through the conduit E resulting from pressure changes. The variation in resistance of the portion of the resistance ER in circuit with the meter on changes in temperature will automatically correct, if the resistance ER is made of suitable material, for the changes in density resulting from changes in temperature in the same manner as compensation is obtained by means of the resistance FR, as above described. It will be apparent that with a constant pressure in the conduit E, the measuring apparatus associated with it becomes identical in principle and operation with the measuring apparatus associated with the conduit F.

Figure 7:
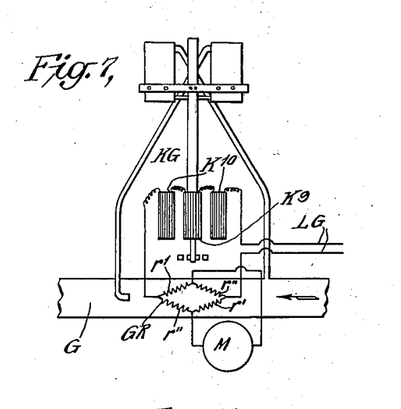
Figure 7 is a diagrammatic representation of the portion of the apparatus shown in Figure 1 for measuring the flow of saturated steam.

The dynamometer circuit LG of the balance FG, for measuring the flow of saturated steam through the conduit G, includes a compensating resistance GR located in the conduit G. The resistance GR cannot in practice be a simple resistance, but must be a compound or network resistance. The necessity for, and nature of this compound resistance may be explained as follows:

The relation between density and temperature for saturated steam may be represented for limited temperature ranges by $$d = d_{t_1}[1 + g(t - t_1)]$$

wherein $g$ is positive and has an average value (between 350° and 400° F. its average value is .01568) much greater than the temperature coefficient of resistance of any metal and alloy suitable for use as a resistance conductor, but the equivalent of the large coefficient needed can be obtained by making the resistance GR in the form of the network shown in Fig. 7.

As shown in Fig. 7 the resistance net work GR is composed of two parallel branches, each comprising two resistance conductors $r'$ and $r''$ in series with one another. The two conductors $r'$ are of the same material and of the same resistance at the same temperature, and similarly the two resistance conductors $r''$ are identical with one another. Each resistance $r'$ may, and ordinarily will, differ from each resistance conductor $r''$ both in magnitude and in the character of its temperature coefficient of resistance. The resistances $r'$ and $r''$ are connected in different order in the two branches. One terminal of the meter M is connected by the common wiring MM to the junction point between the resistances $r'$ and $r''$ in one branch, and the junction of the resistances $r''$ and $r'$ in the other branch is connected by the conductor MG to the appropriate contact $M^2$ of the member M. The meter thus measures a potential difference $e_1$, which is equal to $$\frac{i}{2}(r'-r'')$$

if $\frac{i}{2}$ represents the current flowing through each of the various resistances $r'$ and $r''$. Since all the quantities included in the foregoing equation are constants except $e_1$, $i$ and $t$ the equation may be written as follows $$e_1 = iM[1+N(t-t_1)],$$

M and N being constants. From the same reasoning employed in connection with the compensating resistance FR of Fig. 6, it follows the temperature resistance relations of the resistance conductors $r'$ and $r''$ can be expressed as follows:

$$r' = r'_{t_1}[1+c(t-t_1)];$$
and
$$r'' = r''_{t_1}[1+f(t-t_1)]$$

wherein $c$ and $f$ are constant positive coefficients. It follows, therefore, that $$e_1 = \frac{i}{2}[r'_{t_1} + r_{t_1}c(t-t_1) - r''_{t_1} - r''_{t_1}f(t-t_1)] = \frac{i r'_{t_1} - r''_{t_1}}{2}\left[1 + \frac{r'_{t_1}c - r''_{t_1}f}{r'_{t_1} - r''_{t_1}}(t-t_1)\right]$$

that changes in steam density resulting from changes in steam temperature can be compensated for by making the resistances $r'$ and $r''$ out of such materials and of such values that:

$$\frac{g}{2} = \frac{r'_{t_1}c - r''_{t_1}f}{r'_{t_1} - r''_{t_1}} = N.$$

By a suitable selection of ordinary resistance materials out of which to make the resistance conductors $r'$ and $r''$, and by a suitable proportioning of these two resistances, the value of the expression $$\frac{r_{t_1}c - r''_{t_1}f}{r_{t_1} - r''_{t_1}}$$

can be widely varied and can be either positive or negative though coefficients $c$ and $f$ be both positive. It is feasible, therefore, to employ a compound resistance such as is shown in Fig. 7 made out of materials having positive temperature coefficients of resistance, in lieu, for example, of the simple resistance FR having a negative coefficient of resistance, used in the conduit F.

Figures 8, 9, 10, 11:
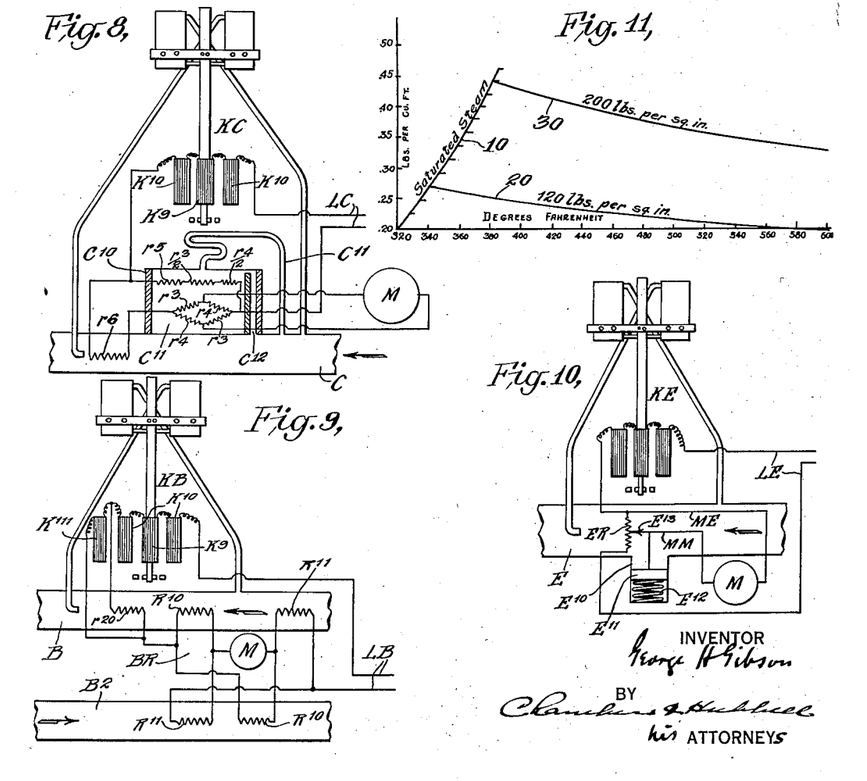
Figure 8 is a diagrammatic representation of the portion of the apparatus shown in Figure 1 for measuring the flow of superheated steam.
Figure 9 is a diagrammatic representation of a portion of the apparatus shown in Figure 1 for measuring the preheat given the boiler feed water.
Figure 10 is a diagrammatic representation of the portion of the apparatus of Figure 1 employed to measure the amount of primary air supplied to the furnace.
Figure 11 is a steam chart illustrating steam laws taken into account in the construction of the apparatus shown in Fig. 8.

The compensating resistance, see Fig. 8, included in the dynamometer circuit LC of the balance KC for measuring the flow of superheated steam through the conduit C comprises a section $r^6$ located in the conduit C, and hence subjected to the actual temperature of the superheated steam and comprises other sections $$r^3, r^4, r^5, \frac{r^3}{2} \text{ and } \frac{r^4}{2},$$

which are located in a receptacle $C^{10}$, containing water at the temperature of saturated steam at the same pressures as that actually existing in the conduit C. To keep the chamber $C^{10}$ filled with water at the described temperature, the upper end of the chamber is connected at its upper end to the conduit C by a pipe $C^{11}$ of sufficient length as to insure some condensation of steam therein, so that the chamber $C^{10}$, which should be insulated against excessive heat radiation, and is heated at the bottom by direct contact with the conduit C, will be filled with boiling water of condensation up to the overflow limit provided for by the return passage $C^{12}$ through which water of condensation may flow back into the conduit C. With this arrangement the water of condensation in the chamber $C^{10}$ will always be at the temperature of saturation of steam at the pressure actually maintained in the conduit C. The resistances $r^3$ and $r^4$ form a network like that shown in Fig. 7, and are similarly connected to the meter M. This network is in series with the resistance $r^6$, and with the latter forms a shunt about the resistances $r^5$, $\frac{r^3}{2}$ and $\frac{r^4}{2}$, which are in series with one another. The resistances $\frac{r^3}{2}$ and $\frac{r^4}{2}$ are made of the same materials and are half the magnitude of the resistances $r^3$ and $r^4$, respectively. The reasons for this and for the other relations which should exist between the various resistances to obtain the desired compensation may be explained as follows:

The density $d$, of superheated steam, is given approximately by the equation $$d = d_s[1 + h(t - t_s)]$$

wherein $d_s$ is the steam density at saturation, for the particular saturation temperature $t_s$ corresponding to the pressure of the superheated steam, and $h$ is negative and has a value of approximately $-.00135$ for pressures between 150 and 200 lbs. per sq. in.

In general it is necessary to compensate for pressure (saturation temperature) and superheat simultaneously. This can be done by the arrangement shown in Fig. 8, wherein $$r^3, r^4, r^5, \frac{r^3}{2} \text{ and } \frac{r^4}{2}$$

designate and represent the resistance value of resistance bodies subjected to the temperature of saturated steam of the same pressure as the superheated steam, and resistance $r^6$ designates and represents the resistance value of a resistance body subjected to the temperature of the superheated steam. Assuming the resistance conductors $r^5$ and $r^6$ are both of the same resistance at the same temperature coefficient $j$; then if the dynamometer current for the balance KC is $i$, the current through $r^6$ will be $$ia = i \frac{r^5 + \frac{r^4}{2} + \frac{r^3}{2}}{r^6 + \frac{r^4}{2} + \frac{r^3}{2} + r^5 + \frac{r^4}{2} + \frac{r^3}{2}}$$

This expression for any given saturation temperature $t_s$ can be written $$ia = \frac{Gi}{L + J(t - t_s)},$$

G, L and J being constants. This follows from the fact that for any one saturation temperature $t_s$ the resistance values $$r^3, r^4, r^5, \frac{r^3}{2} \text{ and } \frac{r^4}{2}$$

are constant; and from the fact that the resistance value $r^6$ at any temperature $t$ above the saturation temperature $t_s$ may be expressed as follows:

$$r^6 = r_s^6[1 + L(t - t_s)]$$

wherein $r_s^6$ is a constant equal to $r^6$ when the latter is at the saturation temperature $t_s$.

Since the potential difference $e_2$ measured by meter M in Fig. 8 is proportional to the current $ia$, we have, expressing $ia$ in terms of $i$, the equation:

$$e_2 = \frac{Ki}{L + J(t - t_s)},$$

K being a constant. From this we derive:

$$i = e_2 \frac{L + J(t - t_s)}{K} = e_2 \frac{1 + \frac{J}{L}(t - t_s)}{\frac{K}{L}}$$

But the weight rate of fluid flow may be expressed as we have seen in terms of the balancing current $i$ and fluid density as $$(w = Ei\sqrt{d} = Ei\sqrt{d_s}\left[1 + \frac{h}{2}(t - t_s)\right],$$

$h$ being a constant and very small and $d_s$ being a constant equal to the steam density at temperature $t_s$. Substituting in the foregoing equation for the term $i$ its value $$e_2 \frac{\left[1 + \frac{J}{L}(t - t_s)\right]}{\frac{K}{L}}$$

we have $$w = \frac{E\sqrt{d_s}}{\frac{K}{L}} e_2 \left[1 + \frac{J}{L}(t - t_s)\right]\left[1 + \frac{h}{2}(t - t_s)\right]$$

The product of the bracketed terms is approximately unity if $$\frac{J}{L} = -\frac{h}{2},$$

since $h$ is so small that the term $\frac{h^2}{4}$ may be disregarded.

It follows, therefore, that for a flow of superheated steam through the conduit C at such a degree of superheat and pressure that the saturation temperature of the steam is the assumed temperature $t_s$, the weight of steam flowing will be approximately proportional to the potential difference measured by the instrument M, provided the resistances are selected and proportioned in accordance with the foregoing principles.

Theoretically steam having a different saturation temperature would require a different arrangement of resistances, but in practice a satisfactory approximation to the weight of steam flowing may be obtained with apparatus calibrated for a single assumed saturation temperature notwithstanding substantial variations from the assumed temperature of the actual saturation temperature. The truth of this statement may be established by reference to a steam chart such as that shown in Fig. 11, wherein the abscissæ represent steam temperatures, and the ordinates represent steam densities in the units expressed on the chart; and wherein 10 is the steam saturation curve and 20 and 30 represent constant pressure steam curves at 120 and 200 pounds per square inch, respectively. If the curves 10, 20 and 30 were straight lines, and the lines 20 and 30 were parallel to one another, then an arrangement of the various resistance sections forming the compensating resistance CR, which is approximately correct for one saturation temperature would be equally correct for all saturation temperatures. While the lines 10, 20 and 30 are not straight lines the portions of them corresponding to considerable differences in steam pressure and superheat depart but slightly from tangents to the middle points of said portions; and the divergence between such tangents to portions of the lines 20 and 30 is quite small. It will be understood, of course, that the departure from parallelism between the lines 20 and 30 is greater than is the corresponding departure between either of these lines and any constant pressure curve for a pressure intermediate those between lines 20 and 30.

In the arrangements shown in Figs. 6, 7, 8 and 10, I obtain a measure of the quantity of fluid flowing by creating an electrical current proportional to the velocity head of the fluid flowing, and compensate for the changes in density resulting from changes in the fluid temperature by causing this electrical current to pass through a simple or compound resistance maintained at such a temperature and having such a thermal coefficient of resistance that a potential difference proportional to the weight of fluid flowing will be secured. A measurable electrical quantity proportional to the weight of the fluid flowing may be obtained in accordance with the present invention by the conjoint utilization of the pressure differential due to the fluid flow through the conduit, and the varying conductivity of a resistance body subjected to the temperature of the fluid and varying in conductivity with its temperature in other ways than that utilized in the arrangement shown in Figs. 6, 7, 8 and 10. For example, a device responsive to the velocity head of the fluid flowing in the conduit, a current regulator controlled thereby, and a resistance having a suitable thermal coefficient of resistance may be utilized to create a balancing dynamometer current which is itself proportional to the weight of fluid flowing, notwithstanding temperature created changes in the density of the fluid, and this method is employed in the B. T. U. meter illustrated in Fig. 9 for obtaining a measure of the amount of heat given to the feed water in passing through the feed water heater B'. As shown, in Fig. 9, the B. T. U. meter comprises two resistance bodies $R^{10}$ and two resistance bodies $R^{11}$. The resistance bodies $R^{10}$ are similar to one another and different from the resistance bodies $R^{11}$, which, however, are similar to one another. One resistance body $R^{10}$ and one resistance body $R^{11}$, are located in the conduit B, and one resistance body $R^{10}$ and one resistance body $R^{11}$ are located in the conduit $B^2$. With this arrangement when an electrical current, proportional in strength to the quantity of fluid flowing, is passed through the circuit LB, comprising the two sections in multiple to each other, and each including in series a resistance $R^{10}$ in one, and a resistance $R^{11}$ in the other of the two conduits B and $B^2$, a suitably calibrated meter connected as is the meter M in Fig. 9, will give a direct measure of the heat absorbed by the fluid in passing through the heater B'. The principles involved in accomplishing this need not be explained herein, as they are fully explained in my prior patent No. 1,267,757 granted on this type of a B. T. U. meter. The meter specifically illustrated in my prior patent is open to the objection, however, that differences in the temperature of the fluid at the point in the conduit at which the velocity head is measured will prevent the balancing electrical current from being at all times truly proportional to the weight of fluid flowing.

With the improved apparatus shown in Fig. 9 the current flowing through the circuit LB is kept truly proportional to the quantity or weight rate of flow of the fluid through the conduit B. This I accomplish by providing a dynamometer coil $K^{111}$ for the flow balance KB, which is supplementary to the balance coils $K^9$ and $K^{10}$, employed with the other flow balances illustrated. The supplementary coil $K^{111}$ is connected in the circuit LB in shunt with a resistance $r^{20}$ having a suitable thermal coefficient of resistance and located in the conduit B.

The manner in which compensation for density changes is made with the arrangement shown in Fig. 9 may be mathematically explained as follows:

$$p = c\frac{w^2}{d} = c\frac{w^2}{d_{t_1}[1+a(t-t_1)]}$$

$c$ being a constant.

Then if $r^{20}$ represents the resistance value of resistance body $r^{20}$, and $r^{21}$ the resistance value of winding $K^{111}$, the pull of the solenoids=

$$Oi^2 + \frac{Pr^{20}}{r^{20}+r^{21}}i^2;$$

the term $$\frac{Pr^{20}}{r^{20}+r^{21}}i^2,$$

being the part due to the compensating coil, and O and P being constants. Then if $r^{21}$ is constant, and large in proportion to $r^{20}$, and if $$r^{20} = r_{t_1}[1+k(t-t_1)];$$

we have $$\frac{w_2}{cd_{t_1}[1+a(t-t_1)]}$$

approximately equal to $$\left[O + \frac{P}{r^{21}}\{1+k(t-t_1)\}\right]i^2.$$

Hence $$\frac{w^2}{1+a(t-t_1)}$$

is approximately equal to $Qi^2$ $$[1+Rk(t-t_1)],$$

Q and R being constants. $i$ will, therefore, vary approximately as $w$ when $Rk=-a$, remembering that $a$ for water is negative.

In the apparatus shown in Figs. 4 and 5, I have illustrated a modification in which an electromagnetic counter balancing force directly proportional to the strength of the current flowing through the dynamometer coils, in addition to a force proportional to the square of that current, is impressed upon the movable frames of the balance KK. This I accomplish by mounting an extra coil $K^{100}$ on the frame KK with its plane parallel to the plane of the oscillation of the frame and within the field of a stationary permanent magnet comprising opposed permanently magnetized parts $K^{101}$ and $K^{102}$. With this form of flow balance it is possible to take accurate account of the fact that the head generated by Venturi tubes, for example, is more accurately represented by the quantity $Av+Bv^2$, than by $Cv^2$, $v$ being the velocity of the fluid and A, B and C constants. In the apparatus shown in Figs. 4 and 5, the electromagnetic counter balancing force may accurately be represented by $Ei+Fi^2$. By balancing this electromagnetic force in my apparatus against a hydraulic force due to the head $Av+Bv^2$, it is thus possible by properly choosing E and F, to cause $i$ to be accurately proportional to $v$. It will be apparent, of course, that where conditions require or make it desirable an extra coil, as the coil $K^{100}$ of Figs. 4 and 5, can be added to the balances shown in Figs. 6, 7, 8, 9 and 10, without in any way changing the principles of compensation hereinbefore described as used in conjunction with those balances.

While in accordance with the provisions of the statutes I have illustrated and described the best modes of carrying out my invention now known to me, it will be apparent to those skilled in the art that changes may be made in the form of the apparatus disclosed and in the manner of practicing the methods described without departing from the spirit of my invention, as set forth in the accompanying claims, and those skilled in the art will understand also that certain features of my invention may sometimes be used with advantage without a corresponding use of other features.

Having now described my invention, what I claim as new and desire to secure by Letters Patent, is:

1. In obtaining measurements involving the quantity rate of flow of a fluid through a conduit, the method of compensating for changes in fluid density resulting from changes in the temperature of the fluid which consists in creating an electrical current which is a function of the velocity of flow, and passing it through a resistance subjected to the temperature of the fluid and having such a temperature coefficient of resistance that when said resistance is varied in temperature with the fluid, a potential difference is created by the flow of the current through the resistance which is proportional to the weight of fluid flowing.

2. The method of measuring the weight of a fluid flowing through a conduit which consists in maintaining an electric current proportional in strength to the velocity of fluid flow and passing the current through a resistance subjected to the temperature of the fluid and having a temperature coefficient of resistance so related to the temperature density coefficient of the fluid that a potential difference will be created which is proportional to the weight of fluid flowing, notwithstanding the changes in the fluid density resulting from changes in its temperature.

3. In obtaining measurements involving the quantity rate of flow of a vapor through a conduit, the method of compensating for changes in fluid density resulting from changes in the temperature and pressure of the vapor which consists in conjointly utilizing the velocity head of the fluid and the variations in conductivity of a resistance varying in conductivity with its temperature, and subjected in part to the actual temperature of the vapor in the conduit, and in part to the temperature of saturation of the vapor when at the pressure actually prevailing in the conduit.

4. The method of obtaining an electric potential drop proportional to the drop which would be obtained by passing an electric current through a resistance having one thermal coefficient of resistance and subjected to a varying temperature by the use of two resistance materials having thermal coefficients of resistance differing from each other and from the first mentioned coefficient, which consists in forming two circuit portions, each consisting of one section formed of one of said materials and a second section in series therewith formed of the other material, subjecting the two circuit portions to the same potential difference while subjecting the end of one circuit at which a section of one material is used to the same potential impressed on the end of the other circuit at which the section of the other material is used, and while subjecting both circuit portions to said varying temperature, measuring the potential difference between the junctions of the two materials in one circuit and the similar junction in the other circuit.

5. The combination with a conduit, of means for maintaining an electric quantity approximately proportional to the weight rate of fluid flow through the conduit said means comprising a source of electric current, a resistance element varying in resistance with the temperature and subjected to the temperature of the fluid flowing in the conduit, a device responsive to variations in the product of the velocity head and density of the fluid flowing through said conduit, and an electric current regulator actuated by said device and connected in circuit with said source of current and said resistance.

6. Apparatus for measuring the quantity rate of flow of a vapor through a conduit regardless of variations in its pressure or degree of super heat, comprising in combination a device responsive to the velocity head of the vapor in the conduit, an electrical current regulator, and a compound compensating resistance comprising a section and means for subjecting said section to the actual temperature of the vapor and a second section and means for subjecting said second section to the saturation temperature of the vapor corresponding to the actual pressure in the conduit.

7. Means for measuring the weight rate of flow through a conduit of a vapor of varying pressure and superheat comprising an electric circuit having two branches in shunt to one another and formed of material varying in conductivity with its temperature, means for subjecting one of said branches, and a portion of the other branch, to the saturation temperature of the vapor at the pressure in said conduit, and for subjecting another portion of said other branch to the temperature actually prevailing in said conduit, means for passing an electric current, proportional to the velocity of flow in said conduit, through said circuit, and means for measuring a potential difference created thereby in said first mentioned portion of said other branch.

8. In combination a conduit and means for measuring the flow of a superheated vapor through said conduit comprising a vessel in heat conducting relation with said conduit connected above its lower end to said conduit by a passage adapted to condense vapor flowing through it into the vessel from the conduit and by an overflow passage adapted to return liquid of condensation to said conduit and means for maintaining an electrical quantity proportional to the weight rate of flow through the conduit comprising a current regulator responsive to the velocity head in said conduit and an electric circuit on which said current regulator acts and which circuit comprises an electrical resistance element located in said vessel and thereby subjected to the temperature of said vapor when saturated at the pressure actually prevailing in said conduit.

9. In combination a conduit and means for measuring the flow of a superheated vapor through said conduit comprising a vessel in heat conducting relation with said conduit and means for equalizing the vapor pressures in said vessel and conduit, and for permitting liquid accumulating in said vessel to overflow into said conduit, and for supplying liquid of condensation of said vapor to said vessel and means for maintaining an electrical quantity proportional to the weight rate of flow through the conduit comprising a current regulator responsive to the velocity head in said conduit and an electric circuit on which said current regulator acts and which circuit comprises an electrical resistance element located in said vessel and thereby subjected to the temperature of said vapor when saturated at the pressure actually prevailing in said conduit.

10. In a flow balance the combination of a differential pressure gauge comprising a movable part subjected to a force proportional to the pressure differential to which said gauge is subjected, and balancing means comprising a cooperating pair of dynamometer current carrying windings, one stationary, and the other mechanically connected to said movable part, and a second electromagnetic device comprising a current carrying winding portion and a cooperating permanent magnet portion, one of said portions being stationary and the other being mechanically connected to said movable gauge part.

11. The combination with a conduit, of a resistance element varying in resistance with its temperature and subjected to the temperature of the fluid flowing through the conduit, means responsive to the fluid velocity head and density of the fluid flowing through said conduit for passing through said resistance an electric current which is a function of the product of the velocity head and density of the fluid flowing through said conduit, and means for measuring the potential drop in said resistance.

GEORGE H. GIBSON.